July 15, 1969   TAKAYOSHI SATO ET AL   3,455,227
EXPOSURE CONTROL MEANS FOR PHOTOGRAPHIC CAMERAS
Filed Sept. 21, 1966   2 Sheets-Sheet 1

INVENTORS:
TAKAYOSHI SATŌ, HIROSHI UEDA.
BY
ATTORNEY

July 15, 1969 TAKAYOSHI SATO ET AL 3,455,227
EXPOSURE CONTROL MEANS FOR PHOTOGRAPHIC CAMERAS
Filed Sept. 21, 1966 2 Sheets-Sheet 2

INVENTORS:
TAKAYOSHI SATŌ, HIROSHI UEDA.

BY

ATTORNEY.

3,455,227
Patented July 15, 1969

1

3,455,227
EXPOSURE CONTROL MEANS FOR
PHOTOGRAPHIC CAMERAS
Takayoshi Sato, Tokyo-to, and Hiroshi Ueda, Yokohama,
Japan, assignors to Kabushiki Kaisha Koparu, Tokyo-to
Japan
Filed Sept. 21, 1966, Ser. No. 580,936
Claims priority, application Japan, Oct. 7, 1965,
40/61,567
Int. Cl. G03b 9/06
U.S. Cl. 95—64  5 Claims

ABSTRACT OF THE DISCLOSURE

An exposure control device for photographic cameras, wherein the diaphragm is operated by an electromagnetic device including a permanent magnet, a movable element and energizing coil. The electromagnetic device is controlled by a Wheatstone type electric bridge having a photo-resistor in one of the branches. Switching transistors of the p-n-p and n-p-n type are connected between the output terminals of the bridge, and a transistor amplifier is connected to the p-n-p and n-p-n type switching transistors. The diaphragm device is controlled in quick and accurate response to a change in the brightness of the object to be photographed by connecting the energizing coil between the output terminals of the transistor amplifier.

BACKGROUND OF THE INVENTION

Field of the invention

The present invention relates to exposure control means for use in photographic cameras, and more particularly to means for automatically controlling a diaphragm device for use in photographic cameras which may be either still cameras or motion picture cameras.

DESCRIPTION OF THE PRIOR ART

Exposure control means for use in photographic cameras comprising a Wheatstone type bridge circuit having, in one of the branches thereof, a photo-resistor which undergoes a change in its resistance value in response to a change in the intensity of the light incident thereto and which serves as a detecting element for detecting a change in the brightness of the object to be photographed; an electric switching circiut composed of a p-n-p type transistor and an n-p-n type transistor and being controlled by a voltage generated between the output terminals of said Wheatstone bridge when said bridge is rendered to an unbalanced state due to such change in the resistance value of said photo-resistor; and an electromagnetic device such as an electric motor, an electric meter or the like) including an energizing coil connected between the common emitter electrode of said transistors and the terminals of power sources, a movable element wound with said coil, and a permanent magnet interacting with said coil; and movable element being adapted to be displaced by causing a current to flow in said energizing coil in a direction complying with the polarity of the voltage generated between the output terminals of said Wheatstone bridge, to thereby actuate a diaphragm device in synchronism with the displacement motion of said movable element and also to control said bridge so as to be rendered to a balanced state again, so that as a consequence, the diaphragm aperture of the camera lens may be controlled, whereby to always maintain the amount of light transmitted from the object to be photographed to the film constant, is known.

In the known exposure control means described above, there have been encountered inconveniences such that the displacement motion of said movable element was not effected quickly in response to the change occurring in the brightness of the object to be photographed due to the magnitude of the current flowing through said energizing coil being small, or that for reasons associated with the manner in which the bridge circuit was connected, the consumption of the battery for use was tremendous due to an increase in the amount of the currentflowing in said bridge circuit when the bridge was rendered to a balanced state especially in case a very bright object was to be photographed or in other words, in case there occurred a reduction in the resistance value of said photo-resistor, or that, because of the performance characteristics of said switching transistors, said transistors failed to be actuated in case the magnitude of the voltage generated between the output terminals of said bridge was small.

SUMMARY OF THE INVENTION

It is, therefore, the primary object of the present invention to provide an exposure control means for photographic cameras which permits the diaphragm device to be controlled in quick and accurate response to a change in the brightness of the object to be photographed, by the provision of at least a pair of amplifying transistors to be connected to the respective collector electrodes of said switching transistors to increase the amount of the current flowing through said energizing coil and also which is capable of preventing an unusually rapid disspiation of the battery for use by an improvement in the arrangement to minimize the magnitude of the current flowing through said bridge circuit.

Another object of the present invention is to provide an exposure control means for photographic cameras which is free from deterioration of the performance sensitivity due to the influence of the base voltage of said transistors by displacing the working point of said switching transistors, so that, even when there is produced a slight voltage between the output terminals of said bridge, or in other words, even when there takes place a slight change in the brightness of the object to be photographed, the movable element can be displaced without a fail, to thereby insure that the diaphragm device is precisely controlled.

Still another object of the present invention is to provide an exposure control means for photographic cameras which permits prevention of wasteful consumption of the battery for use by arranging so that the electric control circuit is broken upon the diaphragm device having been brought to the position of the widest diaphragm aperture.

The present invention will be more clearly understood by reading the following detailed descriptions with reference to the accompanying drawings which are given simply by way of example.

DESCRIPTION OF THE DRAWINGS

Figure 1:
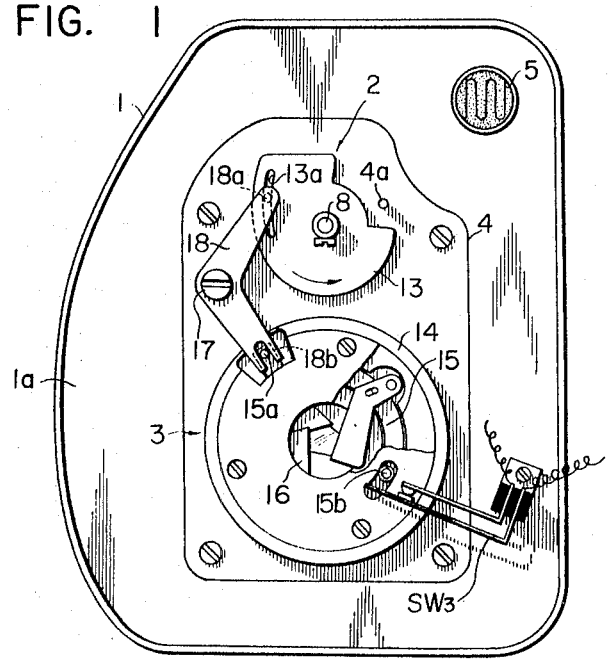
FIG. 1 is a front elevational view of the essential parts of a photographic camera equipped with an exposure control means of the present invention.
Figure 2:
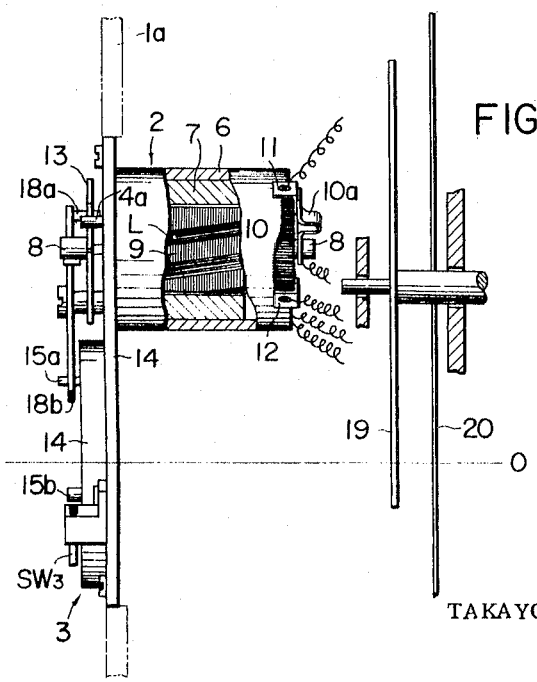
FIG. 2 is a side elevational view, with part broken away, of the exposure control means in FIG. 1.

In FIGS. 1 and 2 are shown an electromagnetic device 2 connected to a electric control circuit which will be described later and also a diaphragm device 3 controlled by its being coupled to said electromagnetic device. A base plate 4 supporting the electromagnetic device 2 and also the diaphragm device 3, and a photo-resistor 5 made with a photoconductive material such as cadmium sulfide and inserted in one of the branches of a Wheatstone type bridge, are mounted securely to the front wall 1a of the camera housing 1. Said photo-resistor 5 is so disposed that it can receive the light reflected from the object to be photographed. The electromagnetic device 2 has a casing 6 which is fixed to the reverse side of the base plate 4. A cylindrical permanent magnet 7 is fixed to the internal periphery of said casing 6.

A movable element 9 having a rotary shaft 8 rotatably supported on the side walls of the casing 6 is mounted concentrically with said permanent magnet 7 in the interior of said magnet 7. Said movable element 9 is wounded with an energizing coil L which is connected to the electric control circuit as will be described later. An arrangement is provided so that when an electric current is caused to flow through the energizing coil L, the movable element 9 will effect an angular displacement by virtue of the interaction between the magnetic field produced by the energizing coil L and the magnetic field provided by the cylindrical permanent magnet 7. A slider 10a of a variable resistor 10 which is inserted in one of the branches of the Wheatstone bridge of the electric control circuit which will be later described is mounted, with an insulation technique, to one edge of the rotary shaft 8.

A variable resistor 10 is mounted, with insulation technique, to the peripheral surface of the end portion of the casing 6 with fasteners 11 and 12, as is shown in FIG. 2. The other end of the rotary shaft 8 extends through the base plate 4 beyond the front face thereof. A control disk 13 which is restricted in its range of movement by a pin 4a protruding outwardly from the face of the base plate 4 and which is provided with a slot 13a is fixed to said other end of the rotary shaft 8. On the front face of said base plate 4 is mounted, coaxially with the optical axis O of an objective lens system (not shown) and adjacent to the electromagnetic device 2, a well-known diaphragm device 3 including a housing 14, a diaphragm operating ring 15 rotatably mounted within said housing 14, and diaphragm blades 16 operated by said ring 15. A crank lever 18 is rotatably and pivotally mounted to a pivotal shaft 17 protruding from the base plate 4.

A pin 18a provided on one end of said crank lever 18 engages into a slot 13a of a control disk 13, while a fork portion 18b formed on the other end of the crank lever engages a pin 15a protruding from the diaphragm operating ring 15. A safety switch $SW_3$ of the electric control circuit which will be described later is mounted at an appropriate portion of the base plate 4 or the camera housing 1. This switch $SW_3$ is normally closed, but is so arranged that it is opened by a pin 15b provided on said diaphragm operating ring 15 or by a similar member only when the diaphragm blades 16 are opened up to the size of the widest diaphragm aperture. In the background of the diaphragm device 3 within the camera housing 1 is disposed a known rotary shutter 19. Behind said rotary shutter 19 is disposed a film 20 which is fed in synchronism with the motion of said rotary shutter 19.

Figure 3:
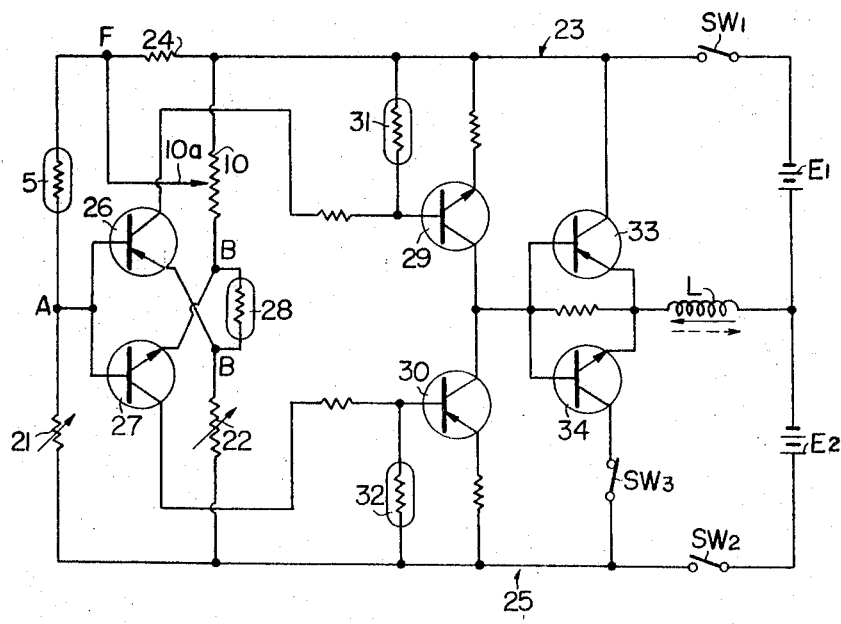
FIG. 3 is a wiring diagram of an electric control circuit of the present invention.

FIG. 3 illsutrates an electric control circuit. Said Wheatstone bridge comprises a photo-resistor 5 of the type as described, a variable resistor 21 which is so composed that its resistance value is set manually so as to comply with the emulsion speed of the film, the aforesaid variable resistor 10, and another variable resistor 22 so composed that its resistance value is set in synchronism with the setting of the shutter speed. A resistor 24 is inserted for connection between the junction of one terminal of the photo-resistor 5 and the slider 10a of the variable resistor 10 and the junction of the line 23 including a switch $SW_1$ and being connected to the negative terminal of the power source $E_1$ and one terminal of the variable resistor 10. The junction of the variable resistor 21 connected to the other terminal of the photo-resistor 5 and the variable resistor 22 is connected to the positive terminal of the power source $E_2$ connected in series to the power source $E_1$. The common base electrode of the p-n-p type and n-p-n type transistors 26 and 27 is connected to the junction A of the photo-resistor 5 and the variable resistor 21, while the emitter electrode of the transistor 26 is connected to the variable resistor 22. The emitter electrode of the transistor 27, on the other hand, is connected to the variable resistor 10. A resistor 28, preferably a thermistor, is inserted for connection between the emitter electrodes of the transistors 26 and 27.

The collector electrodes of said switching transistors 26 and 27 are connected to the base electrodes of the transistors 29 and 30 through resistors, respectively. Also, thermistors 31 and 32 are inserted for connection between the base electrode of the transistor 29 and line 23 and between the base electrode of the transistor 30 and line 25, respectively. The emitter electrodes of the transistors 29 and 30 are connected to lines 23 and 25, respectively. The common collector electrode of these transistors are connected to the common base electrode of amplifying transistors 33 and 34. The collector electrode of said transistor 33 is connected to line 23, while the collector electrode of the transistor 34 is connected, through the switch $SW_3$, to line 25. An energizing coil L of the type described is inserted for connection between the junction of the respective emitter electrodes of the amplifying transistors 33 and 34 and the neutral point of the power sources $E_1$ and $E_2$. A resistor is inserted for connection between the common base electrode and the common emitter electrode of the amplifying transistors 33 and 34.

Description will next be directed to the function of the afore-described exposure control means.

Let us now designate the resistance value of the photo-resistor 5 which is determined by the brightness of the object to be photographed as $R_5$, the resistance value of the variable resistor 21 which is set in compliance with the emulsion speed of the film as $R_{21}$, the resistance value of the variable resistor 22 which is set in compliance with the shutter speed as $R_{22}$, and the resistance value of the equivalent resistance which is determined by the combination of the resistor 24 and the variable resistor 10 as $R_{10}$. Now, if the Wheatstone bridge is in a balanced state, or in other words, if $R_5 \cdot R_{22} = R_{21} \cdot R_{10}$, there is generated no voltage whatsoever between the output terminals A and B of said bridge even if the switches $SW_1$ and $SW_2$ are closed.

As a consequence, neither one of the transistors 26 and 27 is actuated.

Accordingly, no current is caused to flow through the energizing coil L, and the result is that the movable element is held in its resting state, and that, accordingly, the diaphragm aperture is maintained at a constant value. Therefore, so long as this relationship continues, the amount of the light passing through the shutter 19 and reaching the film is held constant.

Now, when there is an increase in the brightness of the object to be photographed followed by an increase in the amount of the light incident to the photo-resistor 5, the resistance value $R_5$ of the photo-resistor 5 decreases, and as a consequence, the relationship between the aforestated respective resistance values is altered to:

$$R_5 \cdot R_{22} < R_{21} \cdot R_{10}$$

As a consequence, a negative unbalanced voltage is generated in the output terminal A of the bridge, while a positive unbalanced voltage is generated in the output terminal B. This causes the transistor 26 to be rendered to "active" state, while the transistor 27 is rendered to "cut-off" state. As a consequence, the transistors 29 and 33 are rendered to "active" state, with a result that a current is caused to flow through the energizing coil L in the direction of the solid arrow from the power source $E_1$ when a current flows through the energizing coil L in the direction of the solid arrow as described above, the movable element 9 of the electromagnetic device 2 is caused to make clockwise rotation (FIG. 1) as a result of the interaction between the magnetic field provided by the permanent magnet 7 and the electromagnetic field produced by the current flowing through the energizing coil L. This rotation of the movable element 9 causes the rotary shaft 8 to rotate the control disk 13 clockwise, with a result that the diaphragm operating ring 15 effects, by virtue of the crank lever 18, a counter-clockwise rotation, causing the diaphragm blades 16 to move towards a position of reduced diaphragm aperture. Along with said movement of the diaphragm blades, the slider 10a which is mounted at one end of the rotary shaft 8 is caused to move so as to reduce the resistance value of the variable resistor 10. When the relationship between the aforesaid resistance values of the resistors is restored to: $R_5 \cdot R_{22} = R_{21} \cdot R_{10}$ in such manner as has been described, there no longer exists a voltage between the output terminals A and B of the bridge. As a consequence, the transistor 26 is rendered again to "cut-off" state, and the movable element 9 rests standstill in its present position. As such, with an increase in the intensity of the brightness of the object to be photographed, the diaphragm aperture reduces its size correspondingly.

When, on the other hand, when there is a reduction in the brightness of the object to be photographed, and as a result the relationship between the respective resistance values is altered to: $R_5 \cdot R_{22} > R_{21} \cdot R_{10}$, a positive unbalanced voltage is generated in the output terminal A of the bridge, while a negative unbalanced voltage is generated in the output terminal B of the bridge, resulting in that the transistors 27, 30 and 34 are rendered to "active" state and that accordingly a current is caused to flow through the energizing coil L in the direction indicated by the dotted arrow from the power source $E_2$. This causes the movable element 9 to rotate counter-clockwise which is the reverse to the direction in the afore-discussed operation.

This counter-clockwise rotation of the movable element 9 causes the diaphragm blades to move towards a position of a larger diaphragm aperture, and this movement ceases when the relationship between the respective resistance values is restored to: $R_5 \cdot R_{22} = R_{21} \cdot R_{10}$.

When it happens that the object to be photographed is so dark that the respective resistance values of the resistors are not rendered to the relationship of:

$$R_5 \cdot R_{22} = R_{21} \cdot R_{10}$$

even after the diaphragm blades 16 have reached the position of the widest diaphragm aperture, the pin 15b of the diaphragm operating ring 15 releases the safety switch $SW_3$. The result is that the transistor 34 is rendered to "cut-off" state, cutting off the excessively large current which flows through the energizing coil L, and thus an intensive consumption of the power source $E_2$ can be prevented. The transistors 27 and 30 still remain in their "active" state, with a result that a slight amount of current continues to flow through the energizing coil in the direction indicated by the dotted arrow, and this provides an advantage that the diaphragm blades 16 are positively held in the fully open position. The switches $SW_1$ and $SW_2$ are so arranged that they are rendered open upon the release of the pressure being applied to the shutter release member.

The fact that a resistor 24 is inserted in one of the branches of the bridge as has been discussed, serves to prevent the power sources $E_1$ and $E_2$ from becoming dissipated even when the slider 10a is displaced and even when the value of the resistance between said slider 10a and the output terminal B is, accordingly, reduced to a great extent, because the current which flows through the slider 10a is restricted by the resistor 24. Furthermore, even when the value of the resistance between the slider 10a and the output terminal B is reduced to a great extent as above, a reduction in the sensitvity of the bridge due to a change in the amount of the incident light can also be prevented because the junction F has been given, through the resistor 24, a potential difference. Furthermore, the fact that, according to the present invention, a thermistor 28 is inserted between the emitter electrodes of the switching transitsors 26 and 27 serves to prevent the occurrence of a reduction in the dynamic senstivity of said transistors 26 and 27 accruing from the influence of the voltage $V_{BE}$ between the base electrodes and the emitter electrodes of said transistors, and makes it possible to positively actuate the transistors 26 and 27 even when there is produced a slight unbalanced voltage between the output terminals A and B due to a slight change in the brightness of the object to be photographed. Thus, precise control of the diaphragm aperture is materialized. Also, variation of the dynamic sensitivity of the transistors 26 and 27 due to the influence of the ambient temperature can be prevented.

The exposure control means of the present invention as it is applied to a motion picture camera has been discussed. It is needless to say that the exposure control means of the present invention may be applied also to a still camera.

It should be understood clearly by those skilled in the art that various modifications, alterations and improvements of the structure and the functions of the minor portions of the exposure control means of the present invention may be made without departing from the spirit of the present invention.

What is claimed is:

1. An exposure control means for photographic cameras comprising a Wheatstone type electric bridge having a photo-resistor for receiving light from an object to be photographed inserted in one of the branches of said bridge; an electromagnetic device including a permanent magnet, a movable element and an energizing coil; and a diaphragm device adapted to be operated by said electromagnetic device, said exposure control means being operative in such manner that said electromagnetic device is actuated by an unbalanced voltage generated between the output terminals of said bridge when said bridge is rendered to an unbalanced state, that said diaphragm device is controlled by virtue of the movement of said electromagnetic device caused by said actuation and that at the same time said bridge is rendered again to a balanced state, characterized in:
 (a) that the base electrodes and the emitter electrodes of a p-n-p type switching transistor and an n-p-n type switching transistor are connected between the output terminals of said bridge;
 (b) that at least a pair of amplifying transistors are connected to said switching transistors and that said energizing coil is inserted for connection between the common emitter electrode of said amplifying transistors and the junctions of the power sources connected to the collector electrodes of said transistors, respectively; and
 (c) that a variable resistor including a slider member operated in association with the movement of said movable element is inserted in one of the branches of said bridge and that a resistor is inserted for connection between the junction of said slider member and said variable resistor and one of the input terminals of said bridge.

2. An exposure control means for photographic cameras according to claim 1, characterized in:
 that a safety switch is inserted in an energizing electric circuit comprising the emitter and the collector electrodes of one of said amplifying transistors; said energizing coil; and said power sources, said safety switch being operative in such manner that said energizing electric circuit is opened when said diaphragm operating member has been brought substantially to the position of the widest diaphragm aperture.

3. An exposure control means for photographic cameras according to claim 1, characterized in:
 that a resistor element, is inserted for connection between the emitter electrodes of said p-n-p type and said n-p-n type transistors and branches of said bridge, to thereby prevent a drop of the dynamic sensitivity of said transistors.

4. An exposure control means for photographic cameras as claimed in claim 3, said resistor element being a thermistor.

5. An exposure control means for photographic cameras, comprising a diaphragm, an electromagnetic device including a permanent magnet, a movable element and an energizing coil adapted for operating said diaphragm device, a Wheatstone type electric bridge having a photoresistor in one of the branches thereof, a p-n-p type switching transistor and a n-p-n type switching transistor connected between the output terminals of said bridge, a transistor amplifier connected to said p-n-p and n-p-n type switching transistors, and means to control said diaphragm in quick and accurate response to a change in the brightness of the object to be photographed, by connecting said energizing coil between the output terminals of said transistor amplifier.

References Cited

UNITED STATES PATENTS

| 3,183,808 | 5/1965 | Teshi et al. | 95—10 |
| 3,291,022 | 12/1966 | Brown | 95—10 |

NORTON ANSHER, Primary Examiner

JOSEPH F. PETERS, Jr., Assistant Examiner

U.S. Cl. X.R.

95—10; 352—141